US011710280B1

(12) United States Patent
Durairaj et al.

(10) Patent No.: US 11,710,280 B1
(45) Date of Patent: Jul. 25, 2023

(54) LOCAL PHYSICAL ENVIRONMENT MODELING IN EXTENDED REALITY ENVIRONMENTS

(71) Applicant: UIPCO, LLC, San Antonio, TX (US)

(72) Inventors: Ravi Durairaj, San Antonio, TX (US); Marta Argumedo, Helotes, TX (US); Sean C. Mitchem, San Antonio, TX (US); Ruthie Lyle, Durham, NC (US); Nolan Serrao, Plano, TX (US); Bharat Prasad, San Antonio, TX (US); Nathan L. Post, Rockport, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 43 days.

(21) Appl. No.: 17/402,408

(22) Filed: Aug. 13, 2021

Related U.S. Application Data

(60) Provisional application No. 63/066,032, filed on Aug. 14, 2020.

(51) Int. Cl.

| | |
|---|---|
| ***G06T 19/00*** | (2011.01) |
| ***G06T 17/00*** | (2006.01) |
| ***G06F 3/01*** | (2006.01) |
| ***G06V 20/20*** | (2022.01) |
| ***G06V 40/20*** | (2022.01) |

(52) U.S. Cl.
CPC ............ *G06T 19/006* (2013.01); *G06F 3/017* (2013.01); *G06T 17/00* (2013.01); *G06V 20/20* (2022.01); *G06V 40/28* (2022.01)

(58) Field of Classification Search
CPC ....... G06T 19/006; G06T 17/00; G06F 3/017; G06V 20/20; G06V 40/28
See application file for complete search history.

(56) References Cited

U.S. PATENT DOCUMENTS

| | | | | |
|---|---|---|---|---|
| 9,875,258 | B1 * | 1/2018 | Hsiao | G06F 16/532 |
| 10,025,447 | B1 * | 7/2018 | Dixit | G06F 3/011 |
| 10,832,476 | B1 * | 11/2020 | Nussbaum | G06V 20/20 |
| 10,931,941 | B2 * | 2/2021 | Valdivia | G06F 3/04847 |
| 11,032,532 | B2 * | 6/2021 | Enriquez | H04N 13/332 |
| 11,200,742 | B1 * | 12/2021 | Post | G06T 19/003 |
| 11,210,851 | B1 * | 12/2021 | Nussbaum | H04W 4/021 |
| 11,282,278 | B1 * | 3/2022 | Zavesky | G06T 19/003 |
| 11,461,820 | B2 * | 10/2022 | Fransen | G06Q 30/0631 |
| 2010/0277468 | A1 * | 11/2010 | Lefevre | H04N 21/816 715/849 |

(Continued)

*Primary Examiner* — Motilewa Good-Johnson
(74) *Attorney, Agent, or Firm* — Potomac Law Group, PLLC

(57) ABSTRACT

Disclosed herein is an environmental scanning tool that generates a digital model representing the surroundings of a user of an extended reality head-mounted display device. The environment is imaged in both a depth map and in visible light for some select objects of interest. The selected objects exist within the digital model at higher fidelity and resolution than the remaining portions of the model in order to manage the storage size of the digital model. In some cases, the objects of interest are selected, or their higher fidelity scans are directed, by a remote user. The digital model further includes time stamped updates of the environment such that users can view a state of the environment according to various timestamps.

20 Claims, 8 Drawing Sheets

(56) References Cited

U.S. PATENT DOCUMENTS

2014/0132633 A1* 5/2014 Fekete .................. G06Q 50/01
345/634
2016/0092959 A1* 3/2016 Gross ................. G06Q 30/0625
705/26.62
2018/0275749 A1* 9/2018 Yoon ....................... G06F 3/017
2019/0051054 A1* 2/2019 Jovanovic ............... G06T 17/00
2019/0188796 A1* 6/2019 Sauer .................. G06Q 20/102
2019/0392643 A1* 12/2019 Busto ...................... G06F 3/016
2020/0005540 A1* 1/2020 Challagolla ............. G06T 19/20
2020/0012916 A1* 1/2020 Dolignon ................ G06F 9/453
2020/0342676 A1* 10/2020 Koohmarey ............ H04L 67/12
2021/0192844 A1* 6/2021 Hutten .................... H04W 4/21
2021/0225038 A1* 7/2021 Holzer .................... G06T 7/246
2021/0279768 A1* 9/2021 Xu ........................ G06T 19/006
2021/0312702 A1* 10/2021 Holzer .................. G06T 15/205
2022/0086205 A1* 3/2022 LeBeau ................. G06F 3/0219
2022/0165059 A1* 5/2022 Faulkner ................. G06F 3/017
2022/0253126 A1* 8/2022 Hollan .................... G06F 3/011
2022/0270505 A1* 8/2022 Carmichael .............. G09B 7/02

* cited by examiner

LOCAL PHYSICAL ENVIRONMENT MODELING IN EXTENDED REALITY ENVIRONMENTS

CROSS-REFERENCE TO RELATED APPLICATION

This application is a non-provisional of and claims priority to U.S. Provisional Application No. 63/066,032 filed on Aug. 14, 2020, entitled "LOCAL PHYSICAL ENVIRONMENT MODELING IN EXTENDED REALITY ENVIRONMENTS," which is hereby incorporated by reference in its entirety for all purposes.

TECHNICAL FIELD

The present disclosure is directed to extended reality devices and more particularly to the use of external environmental cameras to scan and digitally render physical objects.

BACKGROUND

Extended reality (XR) is a form of reality that has been adjusted in some manner before presentation to a user, which may include, e.g., virtual reality (VR), augmented reality (AR), mixed reality (MR), hybrid reality, or some combination and/or derivatives thereof. XR visualization systems are starting to enter the mainstream consumer electronics marketplace. XR Head-Mounted Display (HMD) devices ("XR-HMD devices") are one promising use of such technology. These devices may include transparent display elements that enable a user to see virtual content transposed over the user's view of the real world. Virtual content that appears to be superimposed over the user's real-world view or that is presented in a virtual reality environment is commonly referred to as XR content. Displayed XR objects are often referred to as "holographic" objects. XR visualization systems can provide users with entertaining, immersive three-dimensional (3D) virtual environments in which they can visually (and sometimes audibly) experience things they might not normally experience in real life.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
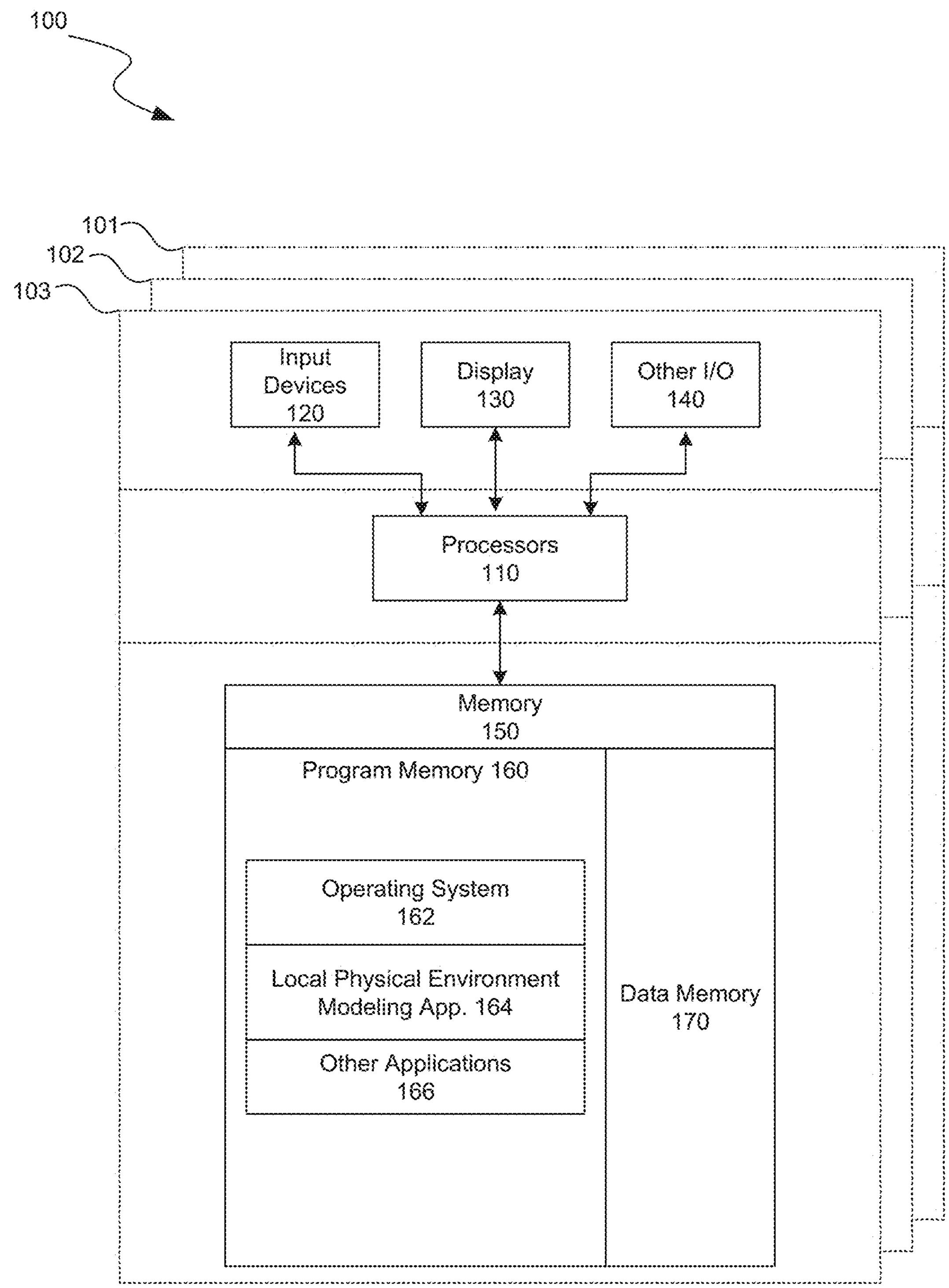
FIG. 1 is a block diagram illustrating an overview of devices on which some implementations of the present technology can operate.

Aspects of the present disclosure are directed to digital models of local physical environments. The digital models are analyzed for identifications of real-world objects and an evaluation of the physical condition of those objects.

Initially, an extended reality display device (XR device) is used to execute an environment scanning application (e.g., for coordinating with a service representative). External facing environment cameras positioned on the XR device or in communication with the XR device capture a local physical environment of a user. The external environment cameras make use of depth sensing to create a textured map of a room. As the user looks around, various captures are stitched together to form a model. The stitched together room model is analyzed by a machine learning computer vision model in order to identify specific objects (e.g., walls, chairs, TVs, tables, cars, etc.).

Once there is a digital model of the local environment, the XR device may add artificial components to the environment through digital renderings. In some implementations, an XR device can display digital renderings without first creating a digital model of the local environment, e.g., by placing digital renderings that are positioned relative to the user without regard to other aspects of the local environment. Included in the artificial components can be an avatar of a second user. The second user does not have to be present with the first user, or even using a corresponding XR device. The avatar may be a true-to-life rendering of the second user, or an animated character. The second user is positioned into the local environment of the user wearing the XR device.

In some implementations, the positioning of the avatar of second user is based on the local environment. That is, the avatar of the second user is not placed intersecting a wall or cut in half by a table. In other cases, the positioning of the avatar of second user can be without regard to the local environment. While present in the local environment, the avatar of the second user interacts with the first user and can deliver instructions via animated renderings or audio data delivered via the XR device. For example, the second user may direct the first user to go look at a particular object within the local environment (thereby enhancing the digital model of that object or generating that object as part of the digital model for the first time). In an illustrative example, an insurance agent whom is represented by an avatar can direct a user to go look at their car with the XR device.

From the digital model of the local environment, the system can render a digital representation of the specific physical object within the local physical environment of the first user to a display of the second user. In some embodiments, the rendering is a 3-dimensional holographic representation in a corresponding XR device of the second user. In other embodiments, the rendering is one or more photographs/images of the object.

Based on the digital model of the local environment and a computer vision machine learning model, the system can identify characteristics (e.g., make and model, size, level or wear or condition, etc.) of the physical object. In some embodiments, the XR device renders a textual label adjacent to the object. With the characteristics, the system may assign a retail value to the object. After the images of the object are captured and the characteristics are determined, a user account may be updated with the data regarding the object as of a present date.

This process can be performed multiple times at different temporal periods. That is, at an initial date, the object is imaged and identified, then at a later date, that same object is revisited, and the condition of the object can be evaluated as compared to the past saved data. Following the illustrative example above where an insurance agent directs a user to view their car, that same user may revisit the condition on their car while making an insurance claim on the status of the car. The subsequent data gathered concerning the object will show damage and the extent thereof. The insurance agent is then able to evaluate the claim in real-time (i.e., during the conversation with the user or within a threshold time, such as minutes, of the conversation) based on the temporally disparate data on the car as collected by the external environmental cameras of the XR device.

In some embodiments, the update to the digital model (and the objects within the model) is performed automatically, and without direction. As the user operates the XR device for any purpose, the digital model of the local environment is persistently updated. Updates the local environment may be locality locked (e.g., so the model remains "local").

Embodiments of the disclosed technology may include or be implemented in conjunction with an extended reality system. Extended reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Extended reality content may include completely generated content or generated content combined with captured content (e.g., real-world photographs). The extended reality content may include video, audio, haptic feedback, or some combination thereof, any of which may be presented in a single channel or in multiple channels (such as stereo video that produces a three-dimensional effect to the viewer). Additionally, in some embodiments, extended reality may be associated with applications, products, accessories, services, or some combination thereof, that are, e.g., used to create content in an extended reality and/or used in (e.g., perform activities in) an extended reality. The extended reality system that provides the extended reality content may be implemented on various platforms, including a head-mounted display (HMD) connected to a host computer system, a standalone HMD, a mobile device or computing system, a "cave" environment or other projection system, or any other hardware platform capable of providing extended reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Extended reality," "extra reality," or "XR," as used herein, refers to any of VR, AR, MR, or any combination or hybrid thereof.

The systems described herein improve the technology in the field of local environment imaging by storing and updating a status of a given object within an environment. The digital models generated as described herein may be temporal in nature and store a record of the physical status of objects in the real world over time. The systems described herein further improve the technical field of communication between users by imaging an avatar of a second user within the environment of the subject user. While there are existing visual communication systems, they fail to enable communications comparable to in-person interaction. For example, existing video calling systems limit how much body language can be perceived and fail to allow users to accurately perceive the environment of the sending user. The systems and processes described herein are expected to overcome these problems associated with conventional video and 3D interaction techniques and are expected to reduce computational requirements of 3D communication while providing more realistic interactions. In addition, while the disclosed 3D conversation systems provide a result comparable to an in-person experience, the processes and systems to achieve this result are not analogs of existing communication techniques, but instead introduce completely new ways of capturing and processing 3D environment characteristics.

Several implementations are discussed below in more detail in reference to the figures. FIG. 1 is a block diagram illustrating an overview of devices on which some implementations of the disclosed technology can operate. The devices can comprise hardware components of a computing system 100 that forms the basis of an XR system. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage and can include both read-only and writable memory. For example, a memory can include one or more of random-access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, a local physical environment modeling application 164, and other application programs 166. Memory 150 can also include data memory 170 that can include eyeprint content, preconfigured templates for password generation, hand gesture patterns, configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
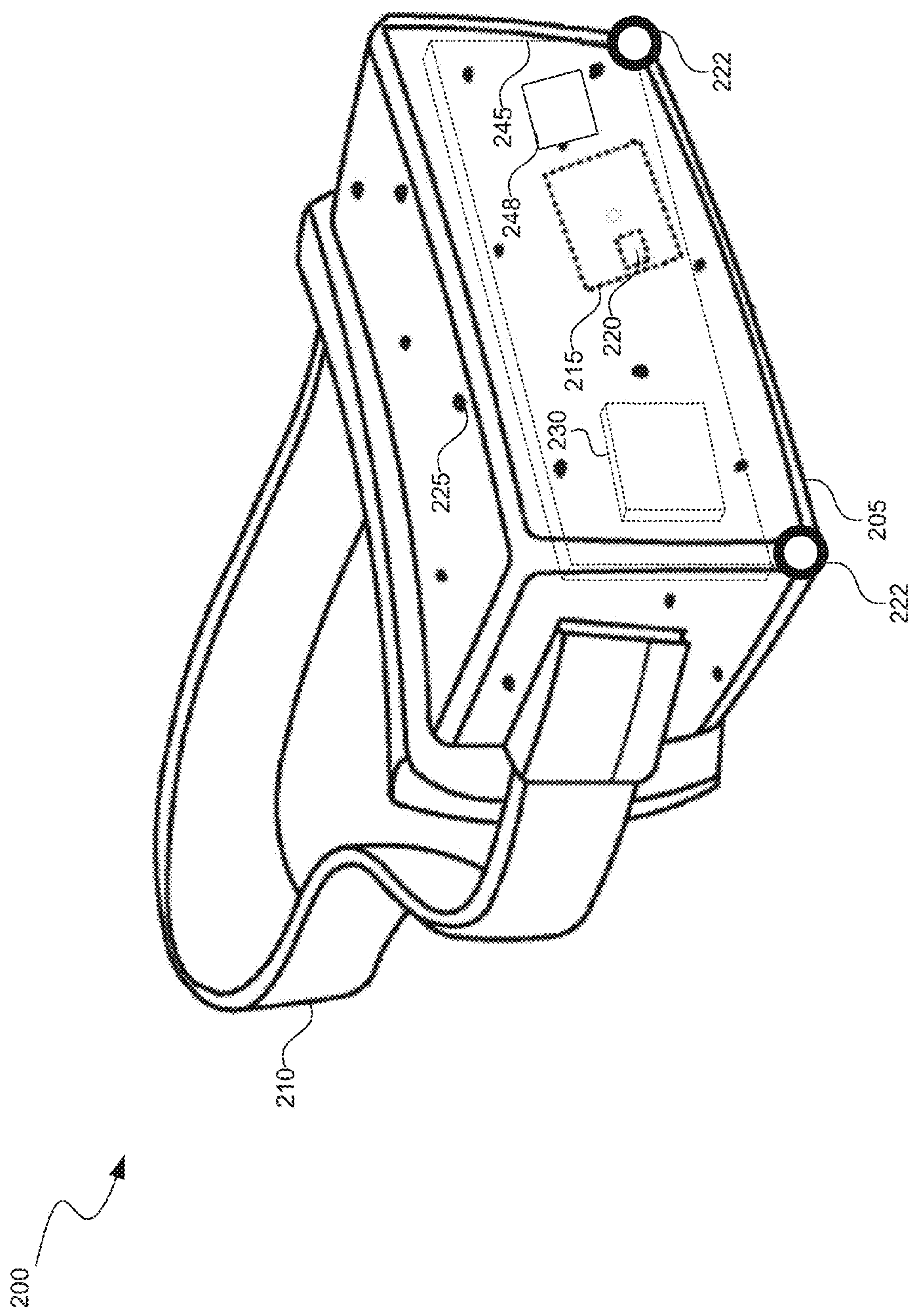
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, external environment cameras 222, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in a virtual environment in three degrees of freedom (3DoF) or six degrees of freedom (6DoF). For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The external environment cameras 222 are used to image the surroundings of the wearer of the HMD 200. External environment cameras often make use of depth-sensing technology such as time-of-flight (ToF) or a phased ToF infrared camera. Alternatively, stereoscopic cameras or pseudo-stereoscopic imaging is used. Often included in the surroundings are the user's hands. The external environmental cameras image the user's hands in various positions in order to capture gestures. The ToF camera makes use of an electromagnetic (EM) emitter that emits light (often in the infrared) which is reflected off environmental objects and returned to the ToF sensor.

In some embodiments, sonar is used instead of or in conjunction with infrared to identify depth. Infrared systems may be "washed out" when used outside in bright sunlight. Conversely, sonar does not suffer from the same interference from the Sun as infrared emitters do. To image and identify objects in the local environment visible light cameras are also used in order to provide context to depth measurements. Visible light imaging is combined with depth measurements to generate a more accurate depiction of the local environment. When rendered to a user not present in the local environment portions of the visible light images may be wrapped around object frames as generated by depth sensing. Alternatively, the visible light images may be compiled with the depth sensing as a lightfield image (e.g., a 2D image that may be refocused to various depths of field based on numerous images captured at each depth of field).

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

In some implementations, the HMD 200 can be in communication with one or more other external devices, such as controllers (not shown) which a user can hold in one or both hands. The controllers can have their own IMU units, position sensors, and/or can emit further light points. The HMD 200 or external sensors can track these controller light points. The compute units 230 in the HMD 200 or the core processing component can use this tracking, in combination with IMU and position output, to monitor hand positions and motions of the user. The controllers can also include various buttons a user can actuate to provide input and interact with virtual objects. In various implementations, the HMD 200 can also include additional subsystems, such as an eye tracking unit, an audio system, various network components, etc. In some implementations, instead of or in addition to controllers, one or more cameras included in the HMD 200 or external to it can monitor the positions and poses of the user's hands to determine gestures and other hand and body motions.

The HMD further includes one or more eye scanners 248. The eye scanner 248 captures images of the user's eyes along with identifying the direction the user's eyes are gazing. The user's gaze, or the motion of the user's eye, may be determined by tracking reflected light off the user's eye. This information may then be used to help correlate the user's line of sight with respect to the projected image, a camera view, the external environment, and the like, and used in control techniques as described herein. For instance, the user may gaze at a location on the projected image and make a selection, such as with an external remote control, making a gesture, or with some detected eye movement (e.g. blinking). In an example of this technique, transmitted light, such as infrared light, may be reflected from the eye and sensed at the electronic display 245 (e.g. with a camera or other optical sensor).

The information may then be analyzed to extract eye rotation from changes in reflections. In embodiments, an eye tracking facility may use the corneal reflection and the center of the pupil as features to track over time; use reflections from the front of the cornea and the back of the lens as features to track; image features from inside the eye, such as the retinal blood vessels, and follow these features as the eye rotates; and the like. Alternatively, the eyepiece may use other techniques to track the motions of the eye, such as with components surrounding the eye, mounted in contact lenses on the eye, and the like. For instance, a special contact lens may be provided to the user with an embedded optical component, such as a mirror, magnetic field sensor, and the like, for measuring the motion of the eye. In another instance, electric potentials may be measured and monitored with electrodes placed around the eyes, utilizing the steady electric potential field from the eye as a dipole, such as with its positive pole at the cornea and its negative pole at the retina. In this instance, the electric signal may be derived using contact electrodes placed on the skin around the eye, on the frame of the eyepiece, and the like. If the eye moves from the center position towards the periphery, the retina approaches one electrode while the cornea approaches the opposing one. This change in the orientation of the dipole and consequently the electric potential field results in a change in the measured signal. By analyzing these changes, eye movement can be tracked.

A further embodiment of the eye scanner 248 may be used to provide biometric data collection and result reporting. Biometric data may be visual biometric data, such as iris biometric data. The eye scanner images the user's eyes enabling biometric comparisons.

Figure 2B:
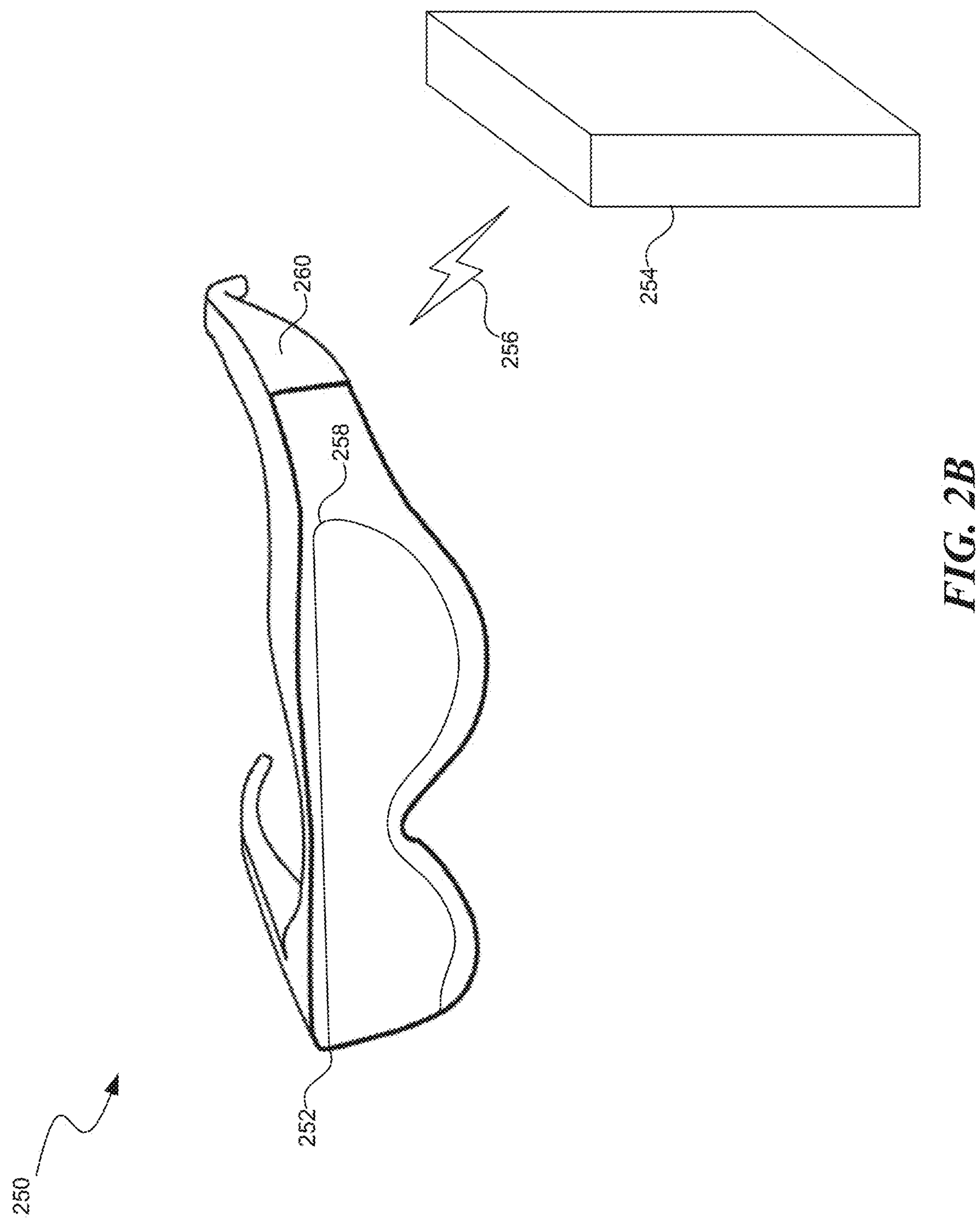
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 3:
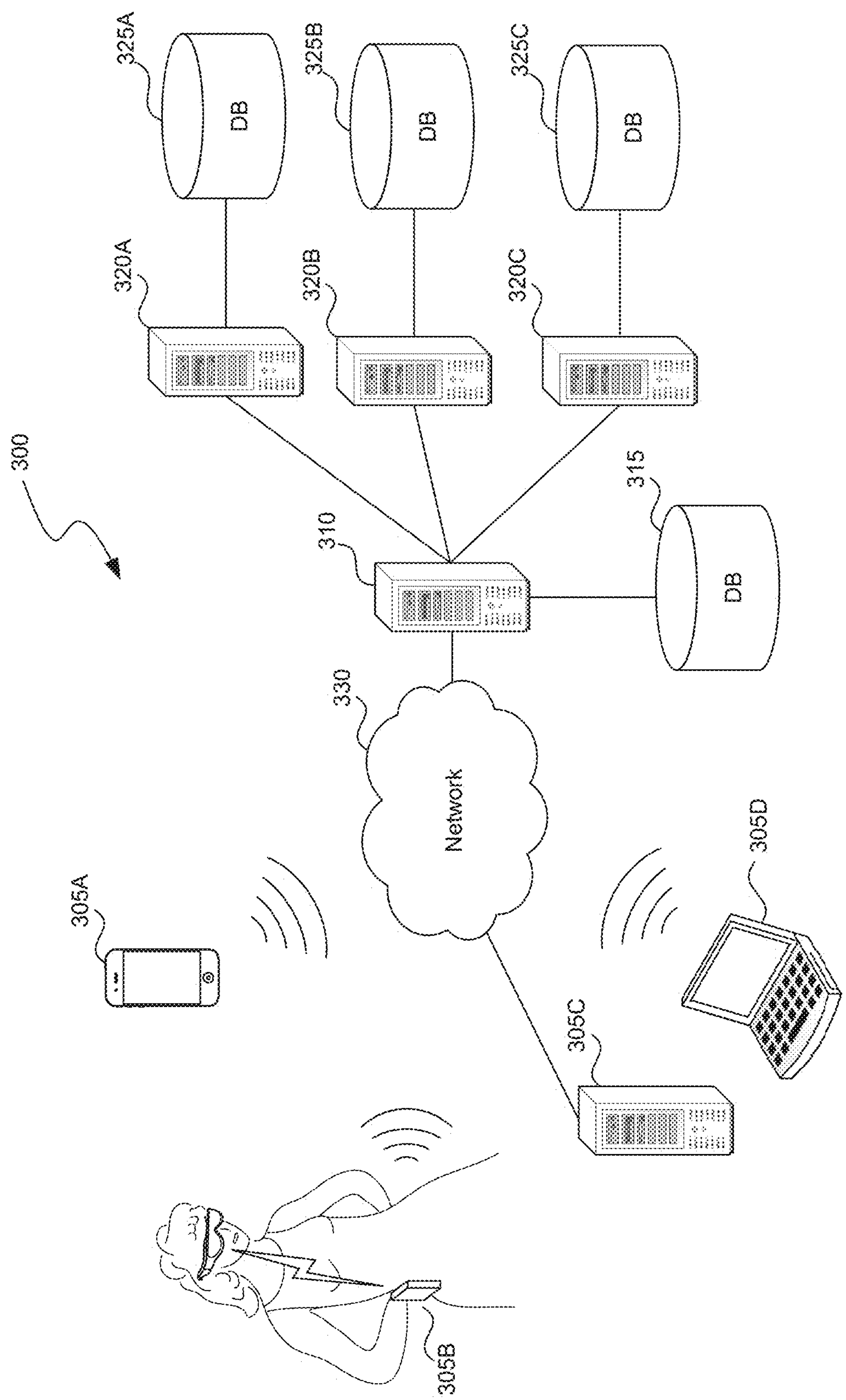
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

Figure 4:
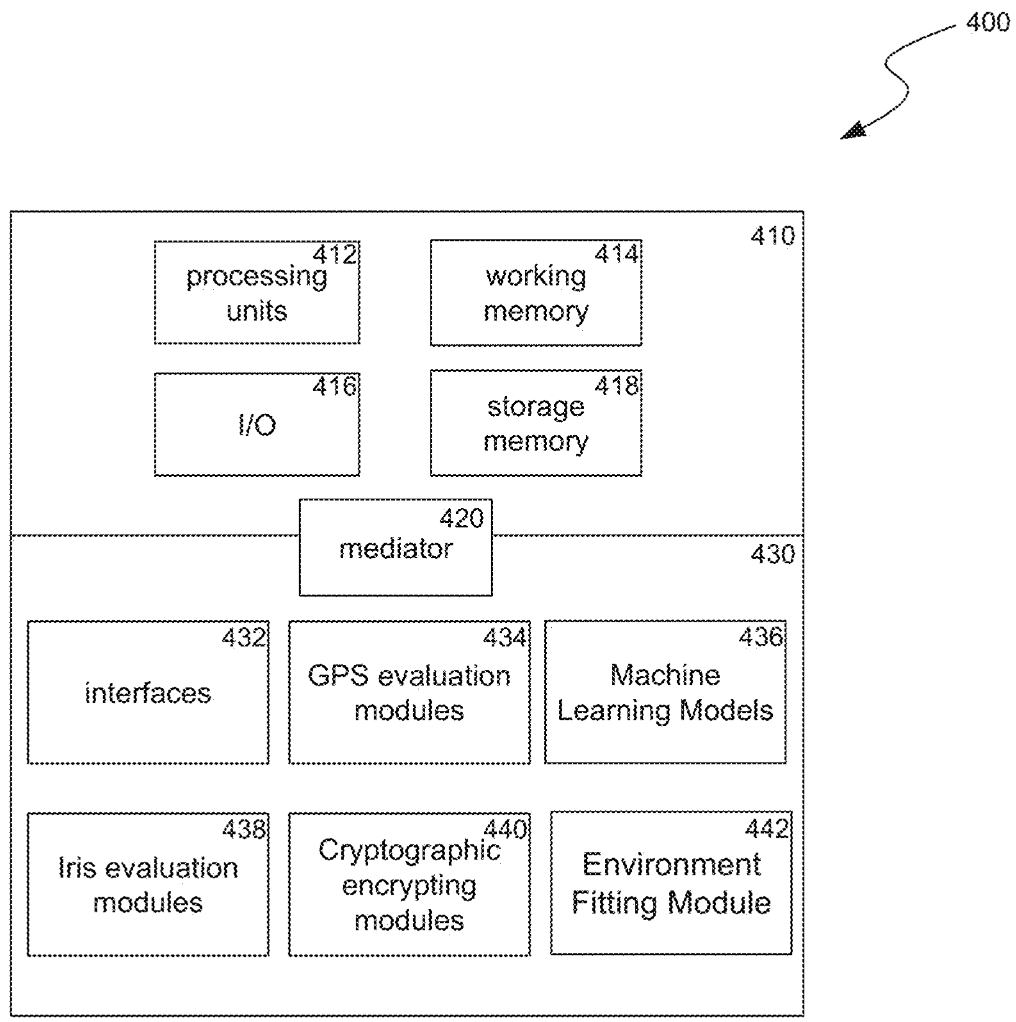
FIG. 4 is a block diagram illustrating components which, in some implementations, can be used in a system employing the disclosed technology.

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for interfaces between budgeting and payment processing. Specialized components 430 can include GPS evaluation modules 434, machine learning models 436, iris evaluation modules 438, cryptographic encrypting modules 440, an environment fitting module 442, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430. Although depicted as separate components, specialized components 430 may be logical or other nonphysical differentiations of functions and/or may be submodules or code-blocks of one or more applications.

The GPS evaluation modules 434 identify the current location of the XR device via the use of a GPS sensor and then compare the location to a GPS stamp on a digital model of an environment. The GPS evaluation modules 434 ascertain that a XR device is currently located in the same location from which the digital model of the environment was captured, thus the digital model is of a local environment. For example, this can allow a recipient to verify that a capture image (e.g., for an insurance quote on a home repair) was taken from the same location as a previous captured image (e.g., an image of the same home before it was damaged). In some embodiments, the user is restricted from performing some actions while at some predetermined locations. In some embodiments, location is based on wireless triangulation as opposed to a GPS sensor. Wireless triangulation often is performed via communication with multiple cell network base stations.

Machine Learning models 436 may operate with one or more hidden Markov models, neural networks, or other machine learned classifications known in the art. The models are trained on a plurality of objects (especially those that are particular to a backend administrator). Embodiments of the identification models make use of any combination of the visible light images as well as the depth map of the environment. In some embodiments, the visible light images are captured only in response to identification of an object of interest via the depth map. In other embodiments, the visible light images are captured, evaluated, and then discarded if they do not include an object of interest. The machine learning models 436 are configured to identify object characteristics (e.g., make and model, size, level or wear or condition, construction material, etc.) within a digital model of a local environment.

Iris evaluation modules 438 are configured to identify distinctive elements of a human iris. Distinctive portions of the human iris may be identified via heuristics and/or machine learning models that are trained on a large set of human iris images. Similarly, cryptographic encrypting modules 440, are configured to operate a cryptographic protocol and encrypt captured images of a user's eyes such that they cannot be easily stolen by malicious actors and such that passwords are not stored in a human readable format. In some embodiments, the iris evaluation modules 438 are present on a backend server and current eye scans are encrypted by the cryptographic encryption module 440 prior to be transmitted to the backend server for validation.

The environment fitting module 442 works in conjunction with the GPS evaluation modules 434 to calibrate an existing digital model of a local environment to the real-world environment. When a user wearing an XR device activates the device, the XR device seeks to place itself in the corresponding digital location to its respective real-world position. Placing the location of the XR device improves the ability of the avatar of a second user to be positioned within the local environment in a location that is both not intersecting real-world objects and is relevant conversationally to the user of the XR device. The environment fitting module 442 performs comparisons between a depth map and current depth calculations in order to fit the digital model to current surroundings.

Those skilled in the art will appreciate that the components illustrated in FIGS. 1-4 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 5:
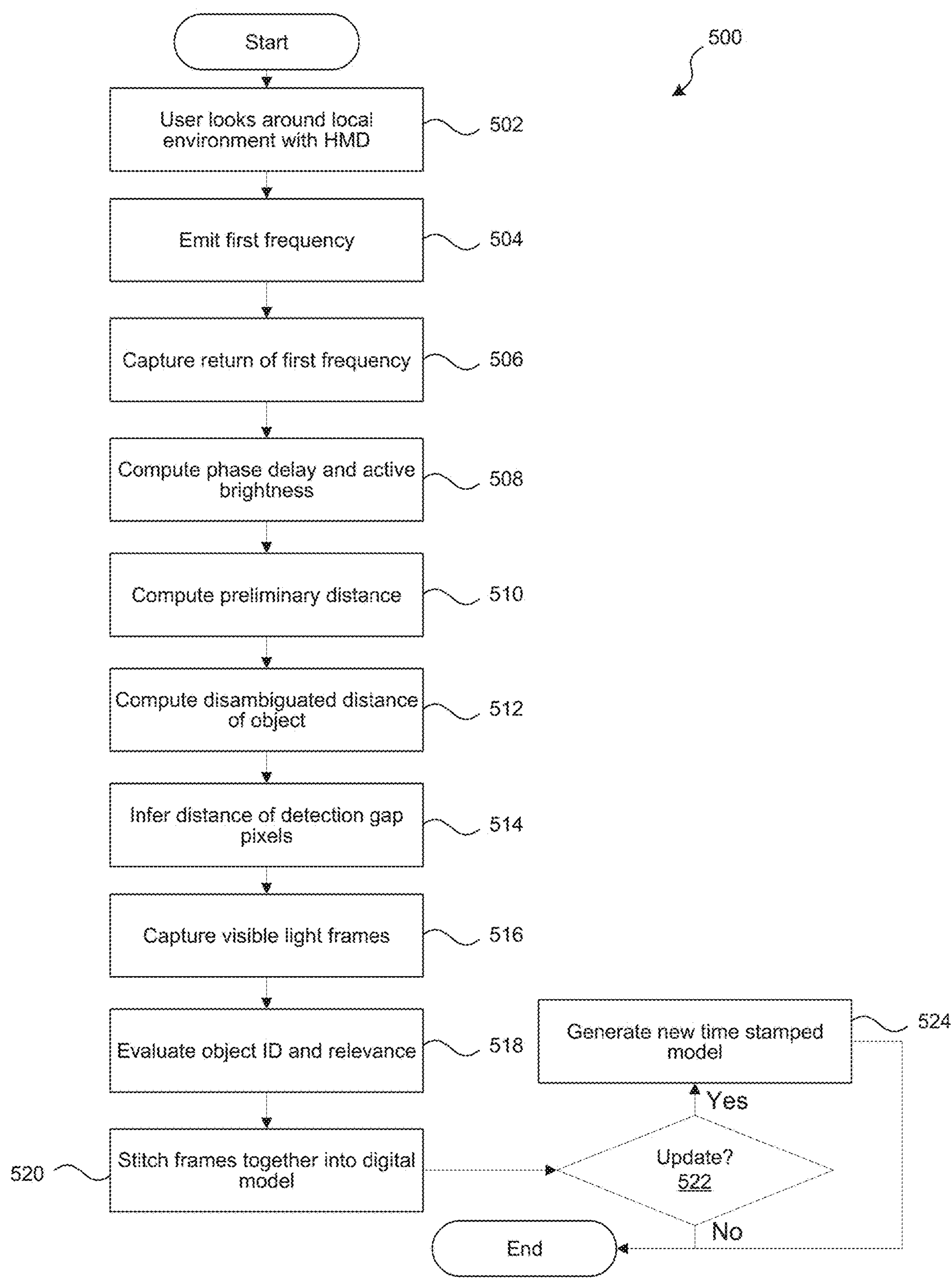
FIG. 5 is a flow diagram illustrating a process of modelling a local environment from an HMD.

FIG. 5 is a flow diagram illustrating a process 500 of modelling a local environment from an HMD. In step 502, a user wears a XR device HMD on their head and looks around. In most systems, the external facing environment cameras tend to have a relatively narrow field of view and the user is directed to look around in order to capture the entire environment. While looking around, the XR device captures a plurality of frames. Each frame has a set of steps beginning from step 504. In step 504, the EM emitter positioned on the XR device emits radiation at a first frequency. In some embodiments, the first frequency is the only frequency. The emission travels away from the depth tracking system and reflects off objects. Reflections return to the depth tracking system. In step 506, a time of flight (ToF) sensor captures the returned radiation of the first frequency. The returned radiation is captured on a pixel-by-pixel basis for the current frame. In step 508, the depth tracking system calculates the active brightness, and phase of the returned first frequency for the current frame. The depth tracking system compares the phase of the returned first frequency to the emitted phase to calculate a phase delay. In some embodiments, a time of flight is measured and compared to the speed of light as having traveled twice the depth of field.

In some embodiments, rather than an EM emitter, a sound pulse or chirp is used similarly based on a sonar implementation. Sonar tends to be more effective than infrared outside in daylight due to interference from the sun. In order for infrared or other EM frequencies to avoid wash out by the sun, the power output on the radiation must be comparatively high. High power output drains battery power more quickly.

In step 510, the depth tracking system calculates a preliminary or estimated depth based on the phase delay and the wavelength of the first frequency or a literal time of flight as compared to the speed of light. The preliminary distance has a number of values corresponding to a particular distance into a phase wrap of a variable number of phase wraps. In step 512, where a phase delay is used, the depth tracking system computes a disambiguated distance of an object (on a pixel by pixel basis).

Disambiguation of depth measurements is relevant where a phase delay indicates a position within a wavelength, but not how many reputations of the wavelength ("wraps") exist between the XR device and the given pixel of the local environment. Disambiguation can be performed using stereoscopic measurements. The number of phase wraps is determined based on the number of phase wraps, at the particular distance into the phase wrap, is closest to the stereoscopic distance. Then the depth tracking system takes the disambiguated distance as the actual distance of the object. Distances to various objects in the local environment (relative to one another and/or the XR device) are referred to as a depth map.

In some embodiments, rather than sonar or EM radiation, stereoscopic images of visible light are used to evaluate depth using parallax calculations. Notably, storing visible light images is often more expensive from a data storage standpoint; thus, where the size of the digital model is a concern, it is preferred to make use of ToF-based depth maps.

The depth tracking system computes actual distance on a pixel-by-pixel basis. In the case where the EM radiation is a structured-light pattern, there may not be complete coverage in the returned radiation for all pixels. In step 514, the depth tracking system infers to distance of the pixels not detected by the ToF sensor. There are a number of ways to infer missing pixels. One of these methods is to derive the shape of a detected object based on the pixels that were detected and fill in the remaining pixels based on a derived shape. Another method is to detect a known type of object (such as a controller) and fill in pixels based on known characteristics of that object. The depth tracking system may also use other suitable methods are known in the art.

In step 516, when each depth frame is captured, there may be an additional visible light frame(s). Visible light frames are not always necessary for all portions of the local environment. Some portions, that are not the focus of a current inquiry, or not the focus of a backend administrator (e.g., where the backend is a car insurance company, they may not need to capture visible light images of walls of a house). Where a given object is a focus of the digital model, a visible light frame is captured. As multiple depth frames are captured so are multiple visible light frames.

In step 518, a machine learning model evaluates and identifies objects in the digital model of the local environment. The machine learning model may operate with one or more hidden Markov models, neural networks, or other machine learned classifications known in the art. The models are trained on a plurality of objects (especially those that are particular to a backend administrator). For example, process 500 may be used in a system to evaluate the value of particular types of objects (e.g., cars, houses, valuable personal property, etc.) and the machine learning models can be trained to identify those type of objects or aspects of those types of objects (e.g., parts of houses). Embodiments of the identification models make use of any combination of the visible light images as well as the depth map of the environment. In some embodiments, the visible light images are captured only in response to identification of an object of interest via the depth map. In other embodiments, the visible light images are captured, evaluated, and then discarded if they do not include an object of interest.

In step 520, after each frame of the local environment is captured, the frames are stitched together to form a cohesive map of the local environment (e.g., a room, a house, the interior of a vehicle, etc.) including graphically rendered objects that were identified as of interest via step 518. In some embodiments, various frames captured in visible light are wrapped around objects within the depth map in order to provide color to the digital model of the local environment. In some embodiments, 2D images of a given object are stored in one or more perspectives as associated with the object. In this manner, the digital model of the local environment is a queryable data structure that can be used to call up images (from multiple angles/perspectives) tied to a given object.

The size of the digital model is affected by the number of visible light images used. Thus, where there are fewer objects of interest within the digital model, the digital model requires less storage space and is easier to transmit.

In some embodiments, object characteristics (e.g., make and model, size, level or wear or condition, construction material, etc.) of specific objects are included as a part of the digital model of the local environment. In various viewing modes, indications of the object characteristics, such as the make and model of objects, appears as a digitally rendered text overlay for either the user of the XR device and/or other users viewing all or portions of the digital model. The text overlay may further include a value assigned for a given object, which may be automatically computed based on the object characteristics.

In step 522, the XR system determines whether the digital model of the local environment is due for an update. If so, in 524, the above steps repeat and add additional time-stamped context to the digital model. Where multiple time stamps are included, the digital model may be queried to indicate what the local environment looked like at a given timestamp. In the case of an insurance claim, one may use the multiple timestamps to identify when damage/loss occurred.

Figure 6:
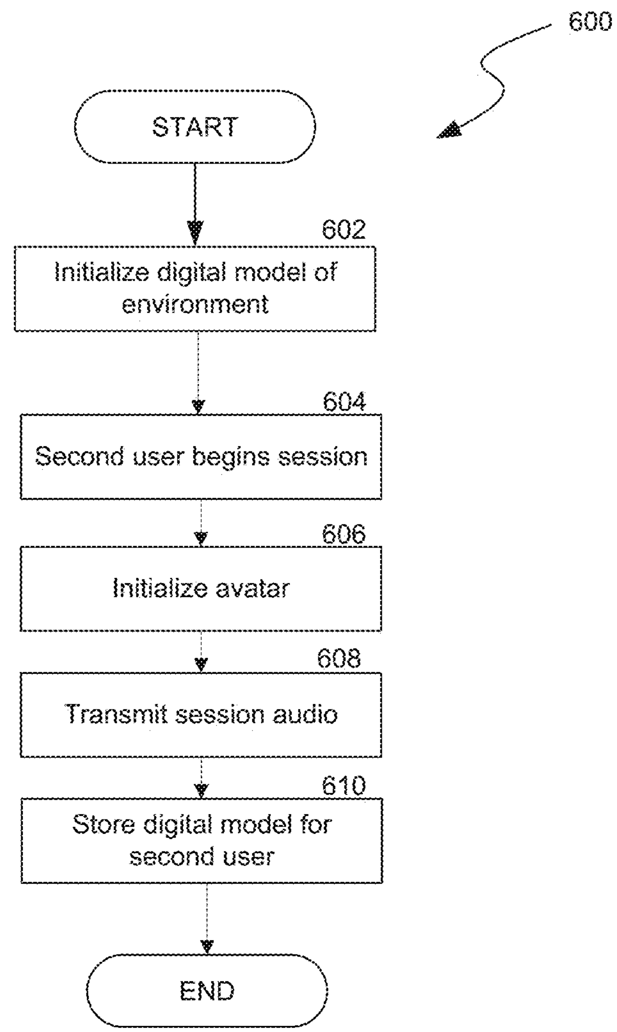
FIG. 6 is a flow diagram illustrating a process where an avatar of a second user is introduced to the local environment and objects of the local environment are rendered for the second user.

FIG. 6 is a flow diagram illustrating a process 600 where an avatar of a second user is introduced to the local environment and objects of the local environment are rendered for the second user. At step 602, a primary user puts on their XR device and loads up the digital model of their local environment (e.g., using process 500). The XR device identifies via GPS coordinates that the user is in fact in the same local environment that was previously captured (as described in FIG. 5). Alternatively, the process described in FIG. 6 may include the generation of the digital model for the first time.

In step 604, a second user begins a session with the primary user. The second user is a user looking to communicate with the primary user, such as a customer service representative. In step 606, the system initialized an avatar of the second user within the local environment of the primary user via the display of the primary user's XR device. The avatar may be a true-to-life depiction of the second user or an animated graphic representation. The style of avatar is based on user preference and/or the equipment used by the second user. A motion capture (MoCap) headset may be used by the second user in order to present a true-to-life avatar. When initialized, the avatar is positioned in the local environment of the primary user.

In some embodiments, the avatar is enabled to move about in the local environment based on controls used by the second user. Where the second user is making use of an XR device with 6DoF tracking, the second user moves freely within their own environment, and is transposed digitally to the local environment of the primary user.

In step 606, an environmental rendering of the primary user's local environment is transmitted and displayed to the second user. The character of the environmental rendering varies based on the apparatus employed by the second user. For example, where the second user makes use of a XR headset, the primary user's whole environment may be holographically presented to the second user. The second user then has all the information required to move within the primary user's environment. Conversely, where the second user makes use of a computer monitor, 2D images of the primary user's environment are displayed to the second user. Using 2D images, or a 2D representation of a 3D space, the second user may judge the environment in much the same way modern video games operate in first person mode.

In step 608, audio is transmitted back and forth between the primary user and the second user during the session, such that the session appears conversation-like. During the course of the session, the second user may direct the primary user around their own local environment and improve the quality of the digital model via additional scans/updates of the model. In some cases, the second user may direct the primary user toward a particular object within the local environment, and in turn improve the quality of the data specifically related to that object. For example, the second user may direct the primary user to take a close look at their car. While viewing the car, the primary user may circumnavigate the vehicle acquiring detailed imaging thereof.

In some implementations, an analysis engine executed by the XR device or a remote system that is receiving images from the XR device can automatically identify features of interest in the primary user's environment and can identify them for the primary and/or second user. For example, the analysis engine can include machine learning models trained to identify damage to particular types of objects, where the models can be trained using pictures from previously verified insurance claims. As another example, the analysis engine can automatically compare images previously submitted by the primary user (e.g., pictures of particular objects) to new images to identify differences (e.g., that may indicate damage). The indications from the analysis engine can include directions to the primary user to focus on the identified locations in the primary user's local environment or indications to the second user, for the second user to provide the instructions to the primary user.

In step 610, the digital model of the primary user's local environment, or portions thereof (e.g., data relating to individual objects) are stored in a database accessible by the second user.

Figure 7:
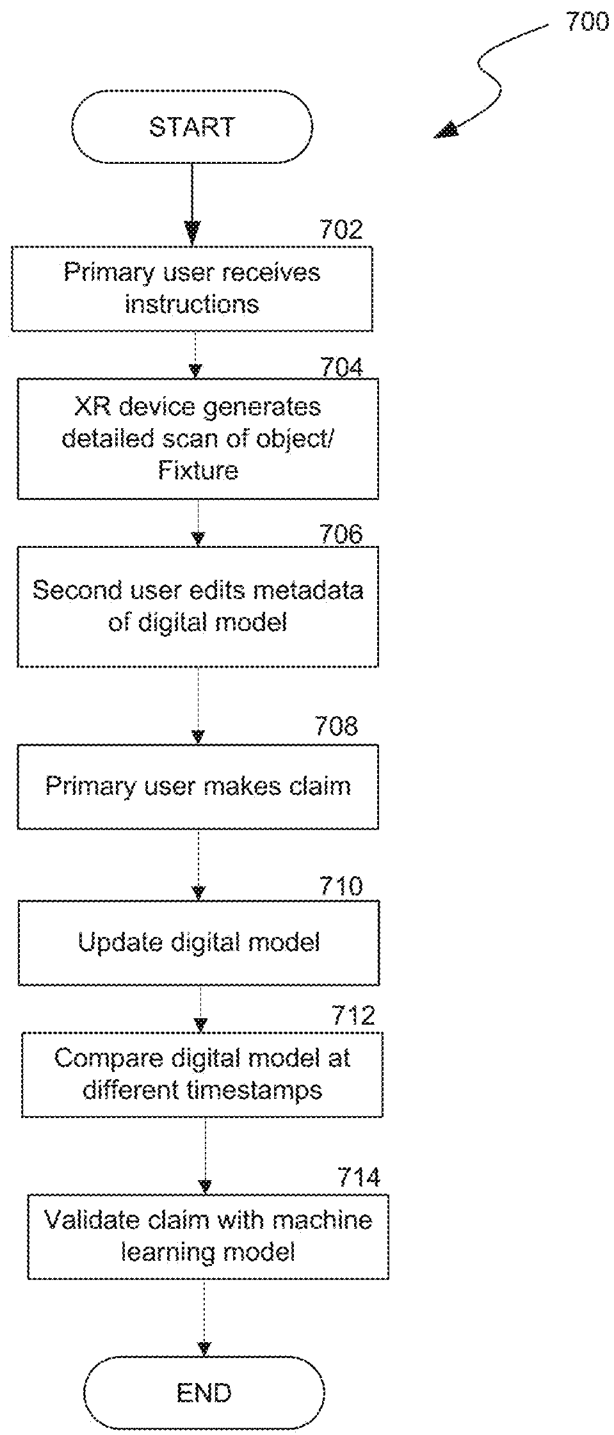
FIG. 7 is flow diagram illustrating a process where a user of the HMD is able make insurance claims based on a local environment scan.

FIG. 7 is flow diagram illustrating a process 700 where a user of the HMD is able make insurance claims based on a local environment model. In step 702, a primary user whom has a second user's avatar in local environment is directed to use the XR device to provide a detailed scan of an object or fixture. In step 704, the primary user situates themselves such that the XR device has a clear view of the object or fixture and provides a detailed scan of the object or fixture to the second user (as described in FIG. 6). The scan of the object or fixture is used to populate an insured profile. Objects and/or fixtures included in the insured profile comprise relevant base documents that establish what a primary user has insured as of a given timestamp. "Signatures" or other account verification may be obtained via iris (e.g., eye) scanning on the primary user via the XR device.

Optionally, the XR device or a remote system that is receiving images from the XR device can automatically identify a current condition of objects via machine learning models. For example, where an object of focus is a car, a machine learning model evaluates the current (initial) scan of the primary user's local environment as compared to "like new" images of the object (e.g., a car). Any damage that is preexisting as identified by the machine learning model is noted and an overall value of the object (car) is adjusted from the value as otherwise denoted by numerical characteristics (e.g., age and miles).

Optionally at 706, the second user may edit portions of the metadata of the digital model. For example, the second user may edit the detected make and model of various objects and or the value of the object (e.g., the object may not be in mint condition and the value may be adjusted due to damage). The second user is further enabled to add notes or comments to individual objects and/or fixtures.

At 708, the primary user issues a request to make an insurance claim. The claim may be issued via the XR device or another compatible device known in the art. At 710, once the claim is issued, the second user again visits (as an avatar) the primary user's local environment, and an updated digital model is created for the primary user's local environment. The second user specifically directs the primary user to view the damage/loss with the XR device such that the most relevant portions of the digital model of the local environment are updated. The updated digital model includes depictions of the damage/loss.

At 712, the second user reviews the comparison between the baseline digital model, and the digital model including the loss and otherwise evaluates the insurance claim.

At 714, the process automatically evaluates the digital model of the local environment (including the original and updated timestamps) for fraudulent claims. A trained machine learning model compares preexisting damage/loss to new damage/loss claimed in order to flag the claim regarding whether the current claimed damage preexisted the coverage. The machine learning model can be trained using case files from rejected insurance claims.

In some embodiments, the digital model can be updated automatically while the primary user makes use of the XR device for other purposes. In this way, the timestamp of the damage/loss may be verified compared to the primary user's claim by comparing images from available digital model timestamps to a timestamp of the insurance claim.

In some implementations, the XR device or a related server can automatically flag claims as potentially fraudulent based on data gathered by the XR device. For example, a machine learning model can be trained to identify a likelihood of a claim being fraudulent based using characteristics of previous rejected insurance claims. In some implementations, additional factors for automatically identifying a claim as fraudulent (either algorithmically or using a machine learning model) the number of claims a user submits, correlating a claim to XR devices sensor data, a history of location of the XR device assuming the device was or movement characteristics (assuming the XR device was worn consistently such as when or after the time a car accident was alleged). For example, based on inertial data collected by the XR device, a machine learning model can identify whether a user (e.g., in a car) has actually been in a crash. Use of the inertial data can validate the set of facts within a given claim.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

The invention claimed is:

1. A method comprising:

capturing a local physical environment of a first user, via external facing environment cameras of a first head mounted extended reality device ("XR device");

generating a digital model of the local physical environment of the first user;

rendering to a display of the first XR device of the first user, a digital avatar of a second user positioned within the local physical environment;

receiving instructions from the second user;

providing, via the first XR device and based on the instructions from the second user, directions for the first user to aim external facing environment cameras of the first XR device at a physical object within the local physical environment of the first user, wherein multiple images captured by one or more of the cameras are each a depth map frame including a digital representation of the physical object;

generating, by combining the depth map frame and a corresponding visible light frame, the digital representation of the physical object within the local physical environment of the first user, the visible light frame being combined with its corresponding depth map frame so as to provide color to a portion of the digital model of the local environment corresponding to the digital representation of the physical object; and transmitting the digital representation of the physical object to a device associated with the second user for display.

2. The method of claim 1, wherein the device associated with the second user is a second XR device worn by the second user and the digital representation of the physical object is displayed, via the second XR device, as a 3D model.

3. The method of claim 1, wherein the device associated with the second user is a second XR device worn by the second user; and wherein the method further comprises causing a system to:

identify a make and model of the physical object based on image recognition performed on the digital model of the local physical environment; and render a textual display of the make and model of the physical object to the display of the second XR device worn by the second user, wherein the textual display is positioned adjacent to the digital representation of the physical object.

4. The method of claim 1, further comprising identifying a make and model of the physical object based on image recognition performed on the digital model of the local physical environment.

5. The method of claim 1, wherein the device associated with the second user is a second XR device worn by the second user; and wherein the method further comprises causing a system to:

identify a make and model of the physical object based on image recognition performed on the digital model of the local physical environment;

render a textual display of the make and model of the physical object to the display of the second XR device worn by the second user, wherein the textual display is positioned adjacent to the digital representation of the physical object; and update a user account of the first user confirming a status of the physical object in response to input by the second user.

6. The method of claim 1, further comprising causing a system to:

identify one or more characteristics of the physical object based on image recognition performed on the digital model of the local physical environment;

render a textual display of the one or more characteristics of the physical object to a display of the device associated with the second user, wherein the textual display is positioned adjacent to the digital representation of the physical object;

update a user account of the first user confirming a status of the physical object in response to input by the second user;

generate a photograph of the physical object based on the digital model of the local physical environment; and store the photograph with the user account of the first user.

7. The method of claim 1, further comprising:

on a date subsequent to the capturing, and in response to a request from an entity associated with the second user, capturing an updated local physical environment of the first user via the external facing environment cameras of the first XR device;

generating, using the captured updated local physical environment, a digital representation of an updated version of the physical object; and transmitting the digital representation of the updated version of the physical object for display;

wherein, in response to the digital representation of the updated version of the physical object, an insurance claim based on a difference between the digital representation of the physical object and the digital representation of the updated version of the physical object is established.

8. The method of claim 1, further comprising:

on a date subsequent to the capturing, and in response to a request from an entity associated with the second user, capturing an updated local physical environment of the first user via the external facing environment cameras of the first XR device;

generating, using the captured updated local physical environment, a digital representation of an updated version of the physical object;

transmitting the digital representation of the updated version of the physical object for display;

wherein, in response to the digital representation of the updated version of the physical object, an insurance claim based on a difference between the digital representation of the physical object and the digital representation of the updated version of the physical object is established; and displaying, on the first XR device, replacement items for the physical object.

9. The method of claim 1, further comprising:

causing identification of characteristics of the physical object via computer vision executed with aspects of the digital model of the local physical environment of the first user an input; and receiving, by the first XR device, hand gesture input via the external facing environment cameras, wherein the hand gesture input confirms the identification of the characteristics of the physical object.

10. The method of claim 1, further comprising:

causing identification of a make and model of the physical object via computer vision executed with aspects of the digital model of the local physical environment of the first user as input; and displaying on the first XR device, a monetary value for the physical object, the monetary value determined based on the make and model.

11. The method of claim 1, further comprising:

associating the digital model of the local physical environment of the first user to a user account; and associating an eyeprint image captured by the first XR device as a password that enables access to the user account.

12. The method of claim 1, further comprising:

associating the digital model of the local physical environment of the first user to a user account; and displaying, on the first XR device, user account details.

13. The method of claim 12, wherein the user account details include identification of a service representative and contact information thereto, the method further comprising:

receiving input from the first user that annotates or communicates specific details of an insurance claim;

comparing the digital representation of the physical object from the digital model of the local physical environment at a first timestamp and a second timestamp via a machine learning model; and identifying an inconsistency between the insurance claim and the comparison of the digital representation of the physical object at the first timestamp and the second timestamp.

14. A system comprising:

one or more processors;

a first head mounted extended reality device ("XR device") including:

an external facing environment camera that captures a local physical environment of a first user via of the XR device;

a memory including instructions that, when executed by the one or more processors, cause the first XR device to generate a digital model of the local physical environment of the first user;

a display that renders a digital avatar of a second user positioned within the local physical environment; and a network interface that:

receives instructions, from the second user transmitted to the first user, directing the first user to aim external facing environment cameras of the first XR device at a physical object within the local physical environment of the first user, wherein multiple images captured by one or more of the cameras are each a depth map frame including a digital representation of the physical object;

wherein the instructions from the second user are provided, by the system, to the first user; and wherein the memory further includes instructions that, when executed, cause the one or more processors to generate, by combining the depth map frame and a corresponding visible light frame, the digital representation of the physical object within the local physical environment of the first user, the visible light frame being combined with its corresponding depth map frame so as to provide color to a portion of the digital model of the local environment corresponding to the digital representation of the physical object; and transmits the digital representation of the physical object to a device associated with the second user for display;

wherein the transmission of the digital representation of the physical object causes a display of the second user to render a digital representation of the physical object within the local physical environment of the first user.

15. The system of claim 14, wherein the display of the second user is a second XR device worn by the second user.

16. The system of claim 14, wherein the memory further includes instructions that, when executed by the one or more processors, cause the first XR device to further:

identify a make and model of the physical object based on image recognition performed on the digital model of the local physical environment;

XR device worn by the second user, wherein the textual display is positioned adjacent to the digital representation of the physical object;

update a user account of the first user confirming a status of the physical object in response to input by the second user;

generate a photograph of the physical object based on the digital model of the local physical environment; and store the photograph with the user account of the first user.

17. The system of claim 14, wherein the external facing environment camera is further configured to subsequently capture, at the request of the second user, an updated local physical environment of the first user, wherein the memory further includes instructions that, when executed by the one or more processors, cause the first XR device to further:

render, using the captured updated local physical environment, a digital representation of an updated version of the physical object; and transmit the digital representation of the updated version of the physical object for display;

wherein, in response to the digital representation of the updated version of the physical object, an insurance claim based on a difference between the digital representation of the physical object and the digital representation of the updated version of the physical object is established; and display, on the first XR device, replacement items for the physical object.

18. A computer-readable storage medium storing instructions that, when executed by a computing system, cause the computing system to perform a process comprising:

capturing a local physical environment of a first user, via external facing environment cameras of a first head mounted extended reality device ("XR device");

generating a digital model of the local physical environment of the first user;

rendering to a display of the first XR device of the first user, a digital avatar of a second user positioned within the local physical environment;

receiving instructions from the second user;

providing, via the first XR device and based on the instructions from the second user, directions for the first user to aim external facing environment cameras of the first XR device at a physical object within the local physical environment of the first user, wherein multiple images captured by one or more of the cameras are each a depth map frame including a digital representation of the physical object;

generating, by combining the depth map frame and a corresponding visible light frame, the digital representation of the physical object within the local physical environment of the first user, the visible light frame being combined with its corresponding depth map frame so as to provide color to a portion of the digital model of the local environment corresponding to the digital representation of the physical object; and transmitting the digital representation of the physical object to a device associated with the second user for display.

19. The computer-readable storage medium of claim 18, wherein the process further comprises:

identifying a make and model of the physical object based on image recognition performed on the digital model of the local physical environment;

rendering a textual display of the make and model of the physical object to the display of the second XR device worn by the second user, wherein the textual display is positioned adjacent to the digital representation of the physical object;

updating a user account of the first user confirming a status of the physical object in response to input by the second user;

generating a photograph of the physical object based on the digital model of the local physical environment; and storing the photograph with the user account of the first user.

20. The computer-readable storage medium of claim 18, wherein the process further comprises:

on a date subsequent to the capturing, and in response to a request from an entity associated with the second user, capturing an updated local physical environment of the first user via the external facing environment cameras of the first XR device;

generating, using the captured updated local physical environment, a digital representation of an updated version of the physical object;

transmitting the digital representation of the updated version of the physical object for display;

wherein, in response to the digital representation of the updated version of the physical object, an insurance claim based on a difference between the digital representation of the physical object and the digital representation of the updated version of the physical object is established; and displaying, on the first XR device, replacement items for the physical object.

* * * * *